(12) United States Patent
Silver et al.

(10) Patent No.: US 10,134,301 B2
(45) Date of Patent: *Nov. 20, 2018

(54) TOY WITH LIGHT EMITTING DIODE

(71) Applicant: Hannah Faith Silver, Longmont, CO (US)

(72) Inventors: Hannah Faith Silver, Longmont, CA (US); Jody Young Balaun, Golden, CA (US); Dawn Marie Yager, Denver, CO (US)

(73) Assignee: Hannah Faith Silver, Longmont, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/997,382

(22) Filed: Jan. 15, 2016

(65) Prior Publication Data

US 2016/0321942 A1  Nov. 3, 2016

Related U.S. Application Data

(62) Division of application No. 14/513,796, filed on Oct. 14, 2014, now Pat. No. 9,242,185.

(Continued)

(51) Int. Cl.
*A63H 33/22* (2006.01)
*A63H 3/00* (2006.01)
(Continued)

(52) U.S. Cl.
CPC ........... *G09B 17/003* (2013.01); *A63H 3/006* (2013.01); *A63H 3/14* (2013.01); *A63H 33/22* (2013.01); *A63H 33/38* (2013.01); *G09B 5/02* (2013.01)

(58) Field of Classification Search
CPC . A63H 3/00; A63H 3/14; A63H 33/00; A63H 33/02; A63F 2009/2444; A63F 2009/2445; G09B 19/00; G09B 19/06
(Continued)

(56) References Cited

U.S. PATENT DOCUMENTS 1,268,622 A  6/1918  Reynolds
4,281,472 A  8/1981  Hill
(Continued)

*Primary Examiner* — Kien Nguyen
(74) *Attorney, Agent, or Firm* — Trenner Law Firm, LLC; Mark D. Trenner

(57) ABSTRACT

A toy has one or more LED light sources positioned on the toy so the light source illuminates beyond the toy. A toy to be worn on the human finger comprises a body includes an anchoring portion for receiving or locating a finger or fingers. A finger puppet toy permits for at least one of a reading tool and a light source or an enhancement of other toys or writings. A LED or other light source is operated on the toy to interact with photo-luminescent ink and other inks. A photo-luminescent ink and other inks are pre-printed or included in a decoration on the surface of another item such as a book or other toy. The toy is a reading tool or a light source or an enhancement of other toys or writings. The LED light sources include a black light and may include other LED lights of other colors. The lights are connected to a circuit board and an integrated power source, which are connected to a switch encased on the toy. The mechanism, number and location of LED lights, the circuit board, wiring, power source and switch are further defined based on the shape of the character of the toy.

8 Claims, 5 Drawing Sheets

Related U.S. Application Data

Figure 1:
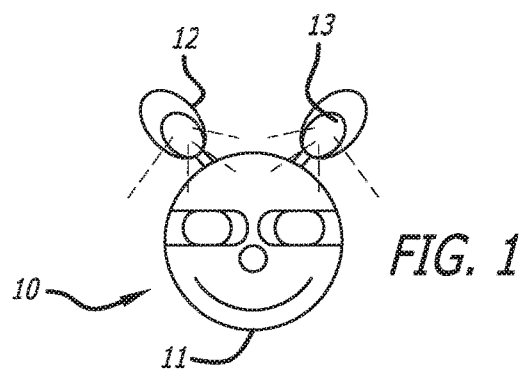

(60) Provisional application No. 61/895,261, filed on Oct. 24, 2013, provisional application No. 61/944,482, filed on Feb. 25, 2014.

(51) Int. Cl.
*G09B 17/00* (2006.01)
*A63H 33/38* (2006.01)
*A63H 3/14* (2006.01)
*G09B 5/02* (2006.01)

(58) Field of Classification Search
USPC .............. 446/175, 219, 484, 26; 434/167
See application file for complete search history.

(56) References Cited

U.S. PATENT DOCUMENTS

| | | | |
|---|---|---|---|
| 6,405,167 B1 * | 6/2002 | Cogliano | G09B 19/06 434/167 |
| 8,568,189 B2 | 10/2013 | Garbos et al. | |
| 2004/0062038 A1 * | 4/2004 | Donovan | B42D 3/123 362/184 |
| 2006/0094327 A1 | 5/2006 | Chernick et al. | |
| 2009/0150160 A1 * | 6/2009 | Mozer | G06F 3/011 704/275 |
| 2012/0315819 A1 | 12/2012 | Gandy | |
| 2013/0102222 A1 | 4/2013 | Clark | |

* cited by examiner

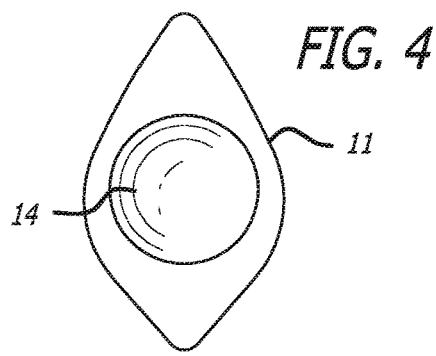
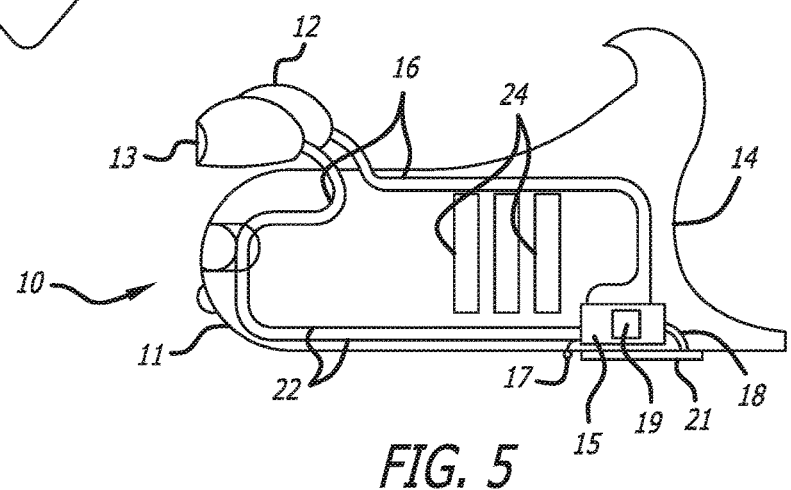
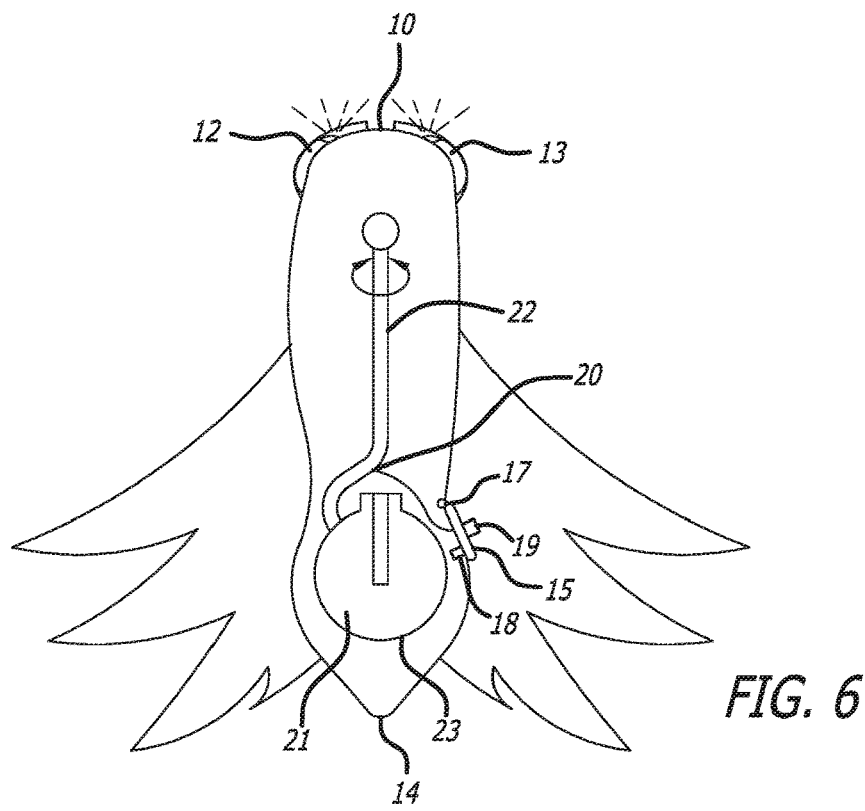

TOY WITH LIGHT EMITTING DIODE

RELATED APPLICATIONS

This application relates to and claims priority from Provisional Patent Application 61/895,261 filed Oct. 24, 2013 entitled LIGHTED FINGER PUPPET; Provisional Patent Application 61/944,482 filed Feb. 25, 2014 entitled TOY WITH LIGHT EMITTING DIODE, and is a continuation of U.S. Utility application Ser. No. 14/513,796 filed Oct. 14, 2014 entitled TOY WITH LIGHT EMITTING DIODE, still pending, the contents of which are incorporated by reference in their entirety herein.

BACKGROUND

The disclosure relates to a toy with one or more LED light sources positioned on the toy so the light source illuminates beyond the toy.

SUMMARY

The toy includes at least one LED light source positioned on a body of the toy so the light source illuminates beyond the body of the toy. The LED light sources include a black light and can include other LED lights of other colors. The light sources are positioned strategically anywhere on the toy.

DRAWINGS

Figure 2:
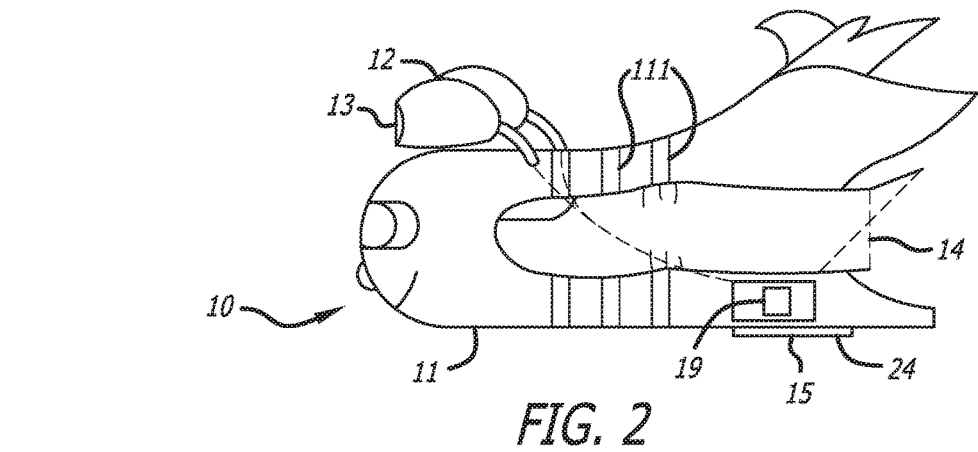
Figure 3:
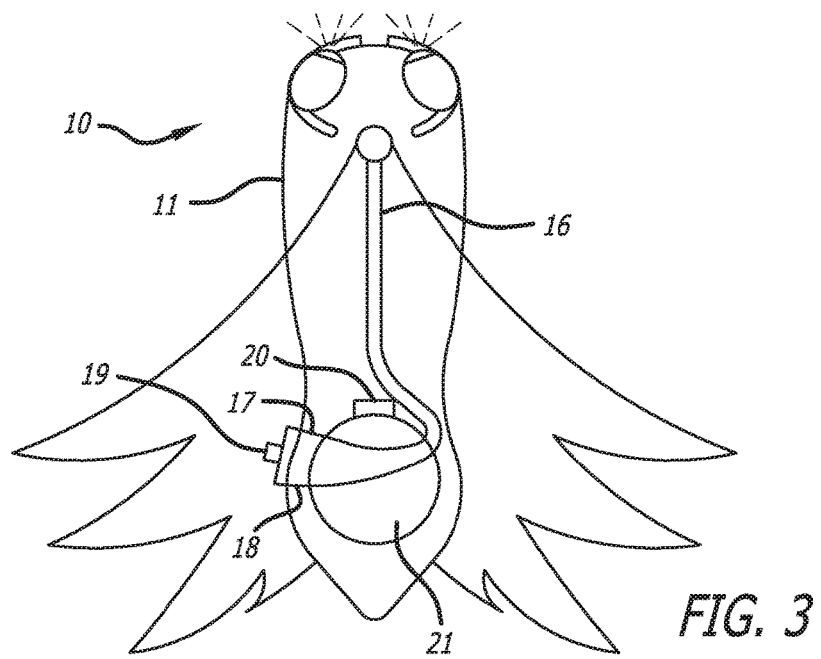
Figure 7:
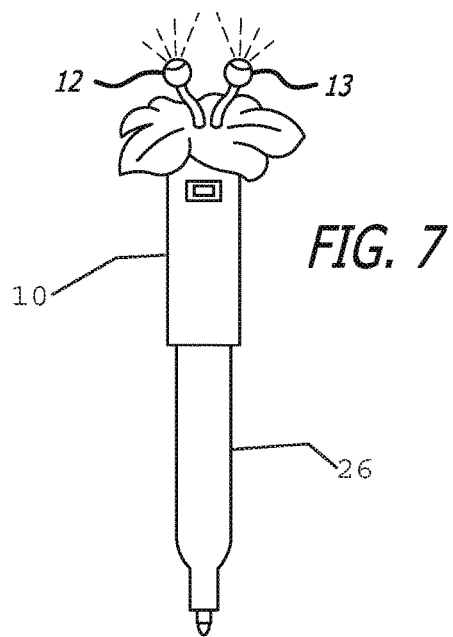
Figure 8:
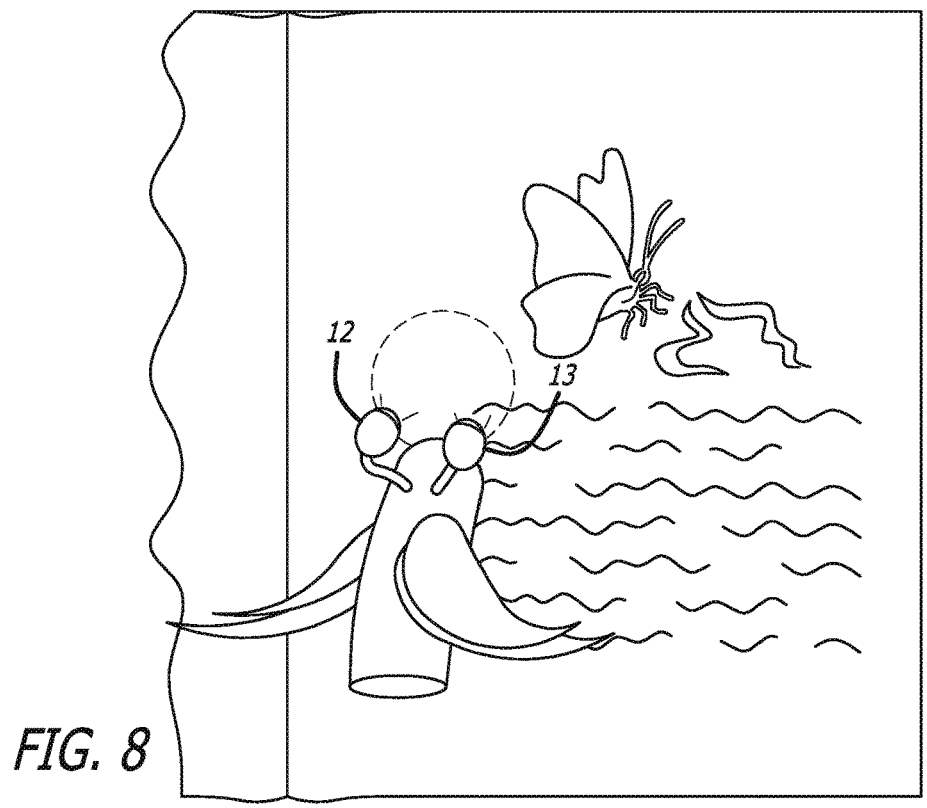
Figure 9:
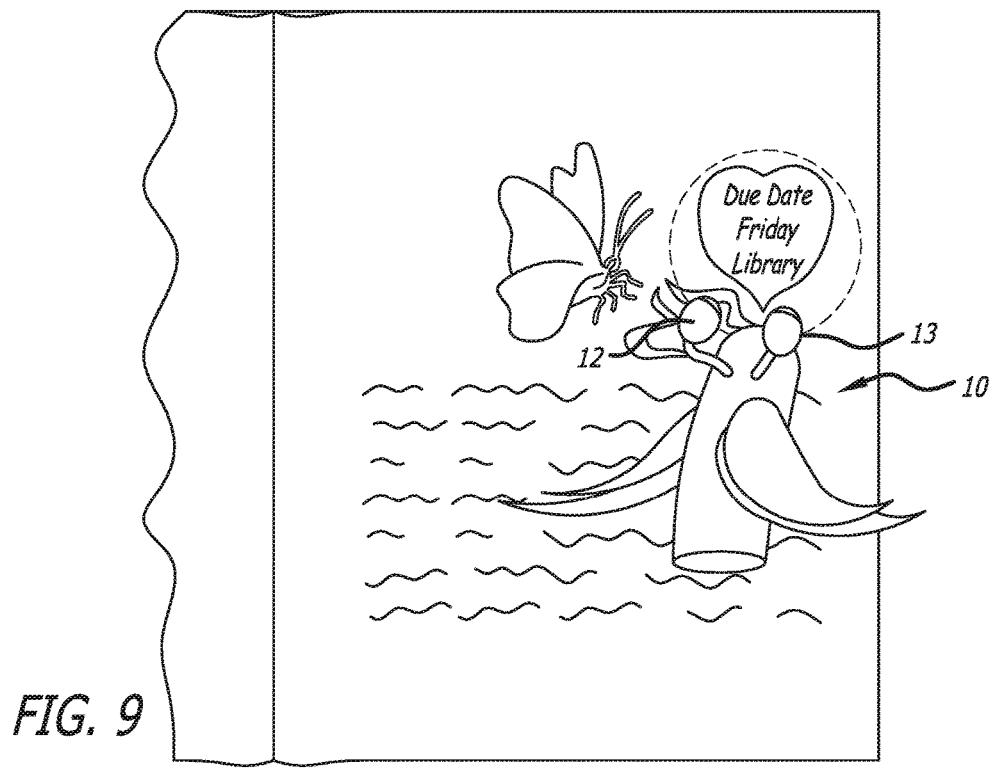
Figure 10:
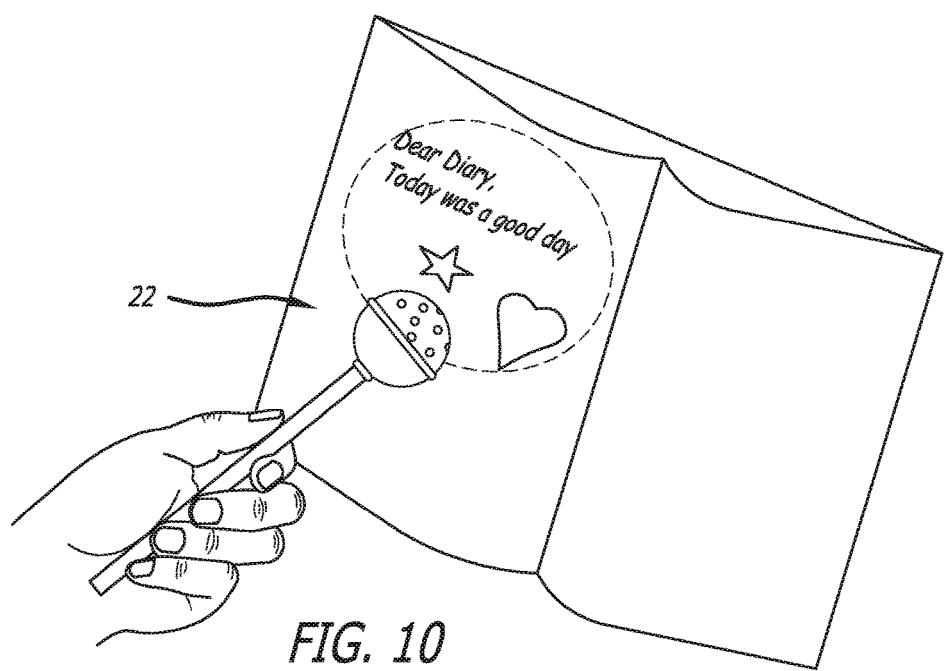
Figure 11A:
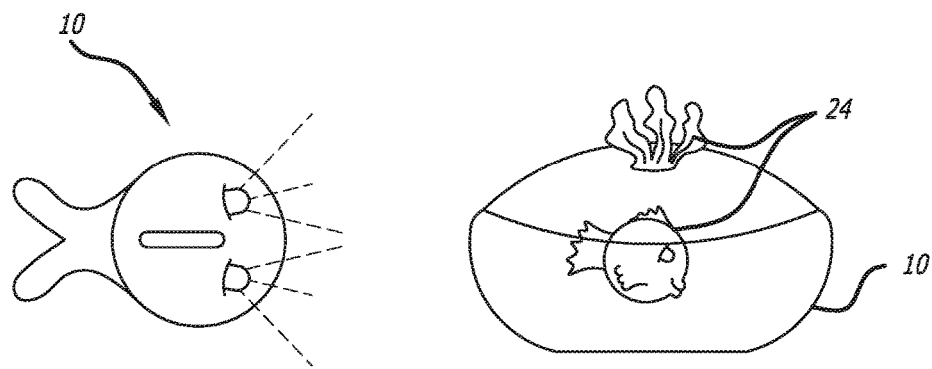
Figure 11B:
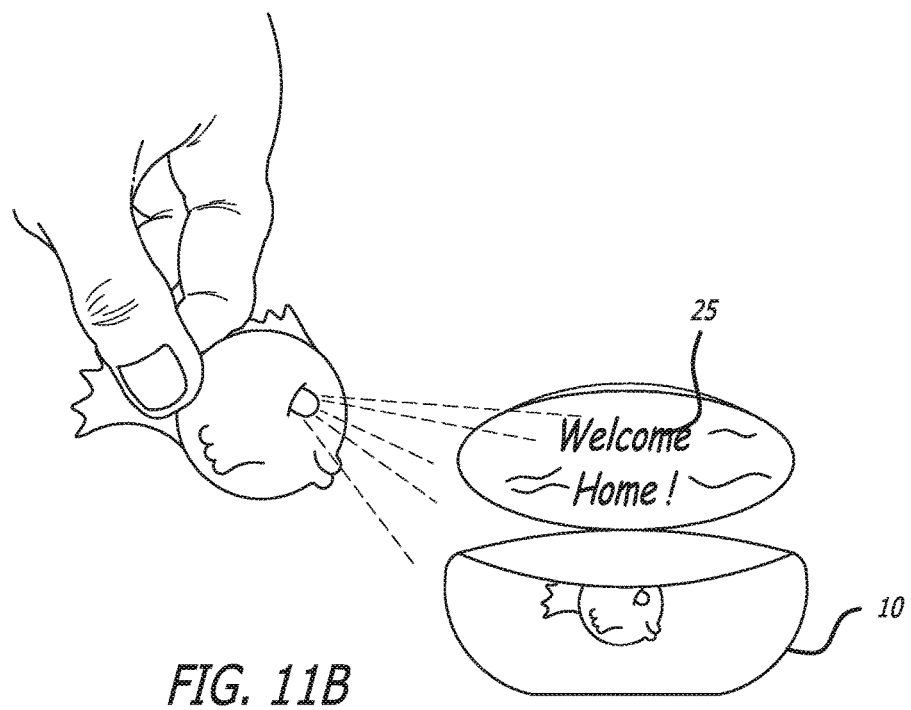

The above-mentioned features and objects of the present disclosure will become more apparent with reference to the following description taken in conjunction with the accompanying drawings wherein like reference numerals denote like elements and in which:

FIG. 1 shows the toy with the front of the body.
FIG. 2 is the toy viewed from one side of the body and demonstrates a switch in the body.
FIG. 3 is the top view of the toy.
FIG. 4 is the back view of the toy.
FIG. 5 is the side view of the toy.
FIG. 6 is the bottom view of the toy.
FIG. 7 is the exterior of a different design for the toy.
FIG. 8 shows the toy lighting up a book with white light.
FIG. 9 shows the toy lighting up photo-luminescent ink on the book.
FIG. 10 is a demonstration of the toy as it relates to the interaction with a book or magazine.
FIGS. 11A and 11B demonstrates another example of the toy interacting with luminescent ink included in a decoration on the surface of another toy.

DETAILED DESCRIPTION

A purpose of this disclosure is to allow the user to have the LED or other light source interact with photo-luminescent ink and other inks. The light source/s emits black light and/or a white light or other colored light.

A toy to be worn on the human finger comprises a body includes an anchoring portion, selectively a substantially hollow housing for receiving or locating a finger or fingers.

The present disclosure is unique because it has a black light and white or other colored lights in a finger puppet/toy. It will be both a reading tool and a light source and will enhance other toys or writings.

A puppet/toy (hereinafter toy) to be worn on the human finger having a substantially hollow housing in which a finger or fingers may be positioned. The interior of the toy is substantially hollow allowing the user to place their finger inside. The toy maybe used as an extension of the finger or hand held. The interior of the body of the toy will have projections, selectively, several circumferential ribs 111 to accommodate different sized fingers.

The toy will have one or more LED light sources positioned on the toy so that the light source illuminates beyond the tip (distal end) of the finger. Light sources may be positioned elsewhere on the toy as well. The lights will be connected to a circuit board and an integrated power source, which will be connected to a switch encased in the toy. The mechanism, nature and location of LED lights, the circuit board, wiring, power source and switch are to be further defined based on the shape of the character of the toy.

The purpose of this disclosure is to allow the user to have the LED or other light source interact with photo-luminescent ink and other inks. The light source/s will emit black light and a white light or other colored light. The number and location of the light source/s will be defined based on the shape and character of the toy. Photo luminescent ink and other inks will be pre-printed or included in a decoration on the surface of another item such as a book or other toy. The black and other lights in the toy will react with the ink.

It is anticipated a child will use this toy to enhance learning to read. The user would place the toy on their finger and then place the tip of the toy under each word as they learn to read. The user would use the toy as a pointer. The user would use the toy to turn pages of a book. The child would use the light to illuminate the words, either in black, white or other colored light, to make reading an interactive experience. The light from this book character puppet/toy could be used to illuminate answers to questions or solve other riddles. The toy could be a character in a book. The toy could be part of a collectible series. The surface of the toy could have a photo luminescent quality so that it glows in the presence of other toys.

The design of the toy will also have a ridge at the proximal end which will allow the toy to act as the cap of a pen, seating into a pen that holds photo luminescent ink. The pen which holds photo-luminescent ink will be applied by the user of the toy to paper or other surface. The person will then use the toy to turn on the LED black and other light. The colored ink will be illuminated by the toy to reveal the hidden writings or enhance the visible message. The toy can then be returned to cap the pen and preserve and protect the ink.

The light source/s will be positioned in the toy in an integrated way to enhance the character of the toy. For example, (but not limited to), the toy could take the shape of the bug and the light sources would be located in the antennae. Another example (but not limited to) would have a toy airplane with the light sources incorporated into the wings.

A toy to be worn on the human finger comprises a body includes an anchoring portion, selectively a substantially hollow housing for receiving or locating a finger or fingers.

The anchoring portion, selectively an interior of the body includes a series of ribs, selectively circumferential ribs, to accommodate different sized fingers.

The toy can include at least one LED light source positioned on the toy so that the light source illuminates beyond the tip (distal end) of the finger.

The toy can include multiple light sources positioned on multiple positions on the toy.

The light is connected to a circuit board and an integrated power source, which will be connected to a switch encased in the toy.

The toy can include a ridge at the proximal end for the toy to act as the cap of a pen, seating into a pen.

The toy can have a white light or other colored lights in a finger puppet toy, and the toy permits for at least one of a reading tool and a light source or an enhancement of other toys or writings.

A method of using a toy comprises locating the toy on the human finger, the toy comprises a body including an anchoring portion, selectively a substantially hollow housing for receiving or locating a finger or fingers. A LED or other light source is operated on the toy to interact with photo-luminescent ink and other inks.

The light source/s emits black light and a white light or other colored light, and wherein the number and location of the light sources is defined based on the shape and character of thereto. A photo-luminescent ink and other inks are pre-printed or included in a decoration on the surface of another item such as a book or other toy.

The toy is used as a finger puppet toy, and having the toy act as a reading tool or a light source or an enhancement of other toys or writings.

FIG. 1 of the toy as viewed from the front 10 of the body 11. FIG. 1 also shows the two LED lights 12, 13, one black light 12 and one white light 13, in the antennae of the toy. The black light 12 would be turned on to react with the ink. The white light 13 would be used for general reading.

FIG. 2 is the toy viewed from one side of the body 11 of the toy. It demonstrates the finger placed inside the toy body 11. FIG. 2 also demonstrates where a switch 15 could be placed integrated into the toy body 11.

FIG. 3 is the top view of the toy. Positive wires 16 from LED lights 12, 13 run through top of toy and connect to two on positions 17, 18 of switch 15 leading to the LED lights 12, 13. The off position 19 of switch 15 connects to the positive position 20 on battery holder 21.

FIG. 4 is the back view of the toy where the finger is inserted 14 in the toy body 11.

FIG. 5 is the bottom view of the toy. Negative wires 22 from LED lights 12, 13 run through the bottom of the toy body 11 and connect to the negative position 23 on battery holder 21. FIG. 6 is the side view of the toy. It demonstrates several circumferential ribs 24 that will accommodate different sized fingers. Both demonstrate how the wiring 16, 22 power source 21 and switch 15 would be integrated into the unit to operate the lights 12, 13. The power source, wiring and switch would be developed further, but the protected idea is the use of the black and white light in the toy.

For instance, instead of a closed body for housing the finger, there may be series of open spaced apart rings. In some cases the finger puppet is in the form of a glove fitting over more than the finger, but part of the hand as well and in some cases more than one finger has respective puppets for each respective finger.

A toy has one or more LED light sources positioned on the toy so the light source illuminates beyond the toy. The LED light sources include a black light and may include other LED lights of other colors as well. Light sources are positioned anywhere on the toy. The lights are connected to a circuit board and an integrated power source, which are connected to a switch encased on the toy. The mechanism, number and location of LED lights, the circuit board, wiring, power source and switch are further defined based on the shape of the character of the toy.

The lights are connected to a circuit board and an integrated power source, which are connected to a switch encased on the toy. The mechanism, number and location of LED lights, the circuit board, wiring, power source and switch are to be further defined based on the shape of the character of the toy.

The lights can be integrated into character or design of the toy. For example, but not limited to, the light sources can be at the end of an imaginative shape such as magic wand, or a scepter held by a princess, or the eyes on a space creature. This toy could have attachments such as a head band (creating a head lamp) or to a clip (like a book light) which could be attached to the toy.

Photo-luminescent ink and other inks are pre-printed or included in a decoration on the surface of another item such as a book or other toy. The black and other lights in the toy react with the ink.

A child uses this toy to enhance reading materials or surfaces of other toys. The child uses the lights integrated into the toy to illuminate the words, either in black, white or other colored light, to make using the other surface an interactive experience.

The light would illuminate hidden images, answers to questions, or solve other riddles. The toy reveals hidden designs on the surface of other toys which is connected with it, to make the toy fun to play with in low light environments.

In addition, as shown in FIG. 7, the toy 10 could be connected to or encase a pen 26 which holds photo luminescent ink. The pen which holds photo-luminescent ink is used to write a message on paper or other surface. The photo luminescent ink is hidden to normal vision and is illuminated by the toy to reveal the hidden writings or enhance the visible message.

The toy 10, 22 shows two LED lights 11, 12, one black-light, 11 and one white light 12 on the front 23 of the toy body 10. The black-light 11 would be turned on to react with the photo-luminescent ink 25. The white light 12 would be used with standard ink 24 for general reading.

Positive wires 14 from the LED lights 11, 12 run through the middle of the toy body 10 and connect with two on positions 15, 16 of switch 13 leading to the LED lights 11, 12. The off position 17 of switch 13 connects to the positive position 18 on battery holder 21. Negative wires 20 from LED lights 11, 12 run through the middle of the toy body 10 and connect to the negative position 18 on battery holder 21. The wand portion 22 of the toy will screw off toy body 10 opening the toy body 10 to reveal battery holder 21.

FIGS. 8, 9 and 10 are a demonstration of the toy 10, 22 as it relates to the interaction with a book, magazine etc., with standard ink 24 and/or photo-luminescent ink 25.

FIGS. 11A and 11B demonstrate another example of the toy 10 interacting with the photo-luminescent ink 25 and/or standard inks 24 preprinted or included in a decoration on the surface of another toy.

The present disclosure is unique because it has a black light and white light concealed in the toy, which interacts with books or other toys with photo luminescent ink.

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method of teaching and learning by of using a toy comprises locating the toy on the human finger, the toy comprising a body including an anchoring portion, a substantially hollow housing for receiving or locating within the hollow housing a finger or fingers during operation of the toy, operating a black light source on the toy to interact with photo-luminescent ink and other inks, wherein the anchoring portion includes an interior interface surface for accommodating within the hollow housing different sized fingers.

2. The method of teaching and learning of claim 1 including having the light illuminate at least one of a hidden image, answer to a question, or a solution to a riddle.

3. The method as claimed in claim 1 wherein the light source/s emits black light and a white light or other colored light, and wherein the number and location of the light sources is defined based on the shape and character of the body, and wherein photo-luminescent ink and other inks are pre-printed or included in a decoration on the surface of another item such as a book or other toy.

4. The method as claimed in claim 1 including using the toy as a finger puppet toy, and having the toy act as a reading tool or a light source or an enhancement of other toys or writings.

5. A method of reading, teaching and learning by using a toy comprising a body including an anchoring portion, a black light source positioned on the toy so that the light source illuminates beyond the body including having teaching material, the teaching material including a surface to be reactive to the light, and using the light to illuminate words on a surface, using the surface as an interactive teaching experience from the illumination, and the interactive experience is reading, teaching of the user and learning by the user, providing reading material with words, the reading material including a surface to be reactive to the black light, and using the light to illuminate the words thereby using the surface as an interactive experience, wherein the anchoring portion is for accommodating within the anchoring portion an interface surface for different sized fingers when operating the toy.

6. The method of reading teaching and learning of claim 5 including having the light illuminate at least one of a hidden image, answer to a question, or a solution to a riddle.

7. The method as claimed in claim 5 wherein the light source/s emits black light, and wherein the number and location of the light sources is defined based on the shape and character of the body, and wherein photo-luminescent ink and other inks are pre-printed or included in a decoration on the surface of another item such as a book or other toy.

8. The method as claimed in claim 5 including using the toy as a finger puppet toy, and having the toy act as a reading tool or a light source or an enhancement of other toys or writings.

* * * * *

UNITED STATES PATENT AND TRADEMARK OFFICE
CERTIFICATE OF CORRECTION

Page 1 of 1

PATENT NO. : 10,134,301 B2
APPLICATION NO. : 14/997382
DATED : November 20, 2018
INVENTOR(S) : Hannah Faith Silver, Jody Young Balaun and Dawn Marie Yager It is certified that error appears in the above-identified patent and that said Letters Patent is hereby corrected as shown below:

On the Title Page

Item (72) Inventors, Lines 1-2, "Hannah Faith Silver, Longmont, CA (US)" should read --Hannah Faith Silver, Longmont, CO (US)--

Item (72) Inventors, Lines 2-3, "Jody Young Balaun, Golden, CA (US)" should read --Jody Young Balaun, Golden, CO (US)--

Signed and Sealed this
First Day of January, 2019

Andrei Iancu
*Director of the United States Patent and Trademark Office*